US012043404B2

(12) United States Patent
Serghine et al.

(10) Patent No.: US 12,043,404 B2
(45) Date of Patent: Jul. 23, 2024

(54) HYBRID PROPULSION CHAIN FOR AN AIRCRAFT COMPRISING AN AUXILIARY MECHANICAL DRIVE SYSTEM

(71) Applicant: SAFRAN HELICOPTER ENGINES, Bordes (FR)

(72) Inventors: Camel Serghine, Moissy-Cramayel (FR); Thomas Klonowski, Moissy-Cramayel (FR); Lois Pierre Denis Vive, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 374 days.

(21) Appl. No.: 17/621,561

(22) PCT Filed: Jul. 7, 2020

(86) PCT No.: PCT/EP2020/069119
§ 371 (c)(1),
(2) Date: Dec. 21, 2021

(87) PCT Pub. No.: WO2021/005057
PCT Pub. Date: Jan. 14, 2021

(65) Prior Publication Data
US 2022/0411081 A1      Dec. 29, 2022

(30) Foreign Application Priority Data
Jul. 9, 2019 (FR) ....................................... 1907646

(51) Int. Cl.
*B64D 35/02* (2024.01)
*B64D 27/02* (2006.01)
(Continued)

(52) U.S. Cl.
CPC ............ *B64D 35/02* (2013.01); *B64D 35/023* (2024.01); *B64D 35/04* (2013.01); *H02K 7/1823* (2013.01); *B64D 27/026* (2024.01)

(58) Field of Classification Search
CPC ...... B64D 35/02; B64D 35/023; B64D 35/04; B64D 27/026; B64D 35/08; H02K 7/1823
See application file for complete search history.

(56) References Cited

U.S. PATENT DOCUMENTS

| 2017/0174355 A1 | 6/2017 | Waltner et al. |
| 2018/0037333 A1 | 2/2018 | Willford et al. |
| 2019/0061924 A1 | 2/2019 | Kita |

FOREIGN PATENT DOCUMENTS

| FR | 3056555 A1 | 3/2018 |
| WO | WO 2017/009037 A1 | 1/2017 |

OTHER PUBLICATIONS

Search Report from the French Intellectual Property Office on corresponding FR application (FR1907646) dated Feb. 26, 2020.
(Continued)

*Primary Examiner* — Tien Q Dinh
*Assistant Examiner* — Katherine June Bolek
(74) *Attorney, Agent, or Firm* — Aumen IP Law PC

(57) ABSTRACT

A hybrid propulsion chain for an aircraft, the hybrid propulsion chain comprising a plurality of propulsion rotors connected to an electrical distribution module by a plurality of electrical connections, the electrical distribution module being connected, on the one hand, to a non-propulsion turbine engine via an electrical generation system and, on the other hand, to an electric battery, each propulsion rotor comprising a stator member and at least one rotor shaft which is configured to be rotated with respect to the stator member when the stator member is electrically powered, the hybrid propulsion chain comprising an auxiliary mechanical drive system mechanically connected to the non-propulsion (Continued)

turbine engine, the auxiliary mechanical drive system comprising a plurality of mechanical connections for mechanically rotating at least one rotor shaft of each propulsion rotor.

10 Claims, 7 Drawing Sheets

(51) Int. Cl.
*B64D 35/023* (2024.01)
*B64D 35/04* (2006.01)
*H02K 7/18* (2006.01)

(56) References Cited

OTHER PUBLICATIONS

International Search Report and Written Opinion on corresponding PCT application (PCT/EP2020/069119) from International Searching Authority (EPO) dated Sep. 25, 2020.

HYBRID PROPULSION CHAIN FOR AN AIRCRAFT COMPRISING AN AUXILIARY MECHANICAL DRIVE SYSTEM

TECHNICAL FIELD

The present invention relates to the field of propulsion of an aircraft comprising several propulsion rotors electrically powered by a non-propulsion electric generation turbomachine.

In a known manner, it has been proposed to equip an aircraft with a hybrid propulsion system comprising a non-propulsion electric generation turbomachine, a battery and a plurality of electrically powered rotors. Such a hybrid propulsion system allows for the optimal transportation of goods and cargo while limiting noise pollution and fuel consumption.

With reference to FIG. 1, a hybrid propulsion chain of an aircraft 100 according to prior art is represented. In this example, the hybrid propulsion chain 100 comprises a plurality of propulsion rotors R1-R4 electrically powered by a distribution module 110 itself powered, on the one hand, by a non-propulsion turbomachine T via an electric generation system 120 and, on the other hand, via an electric battery BAT. Each propulsion rotor R1-R4 is connected to the energy distribution module 110 via one or more power supply buses E1-E4.

In practice, the battery BAT has to be oversized with respect to the need for normal operation requirement so as to be able to supply additional electric energy in case of either temporary need such as the takeoff phase and landing, or exceptional need such as an evasive action or bypass phase, or during failure or unavailability of an element of the propulsion chain. Oversizing the battery BAT leads to an increase in the battery mass, with regard to the current state of the art on the power mass densities of electrochemical cells, thus limiting the load capacity of the aircraft to carry passengers or loads.

One of the purposes of the present invention is to provide a hybrid propulsion chain for providing additional mechanical energy in case of exceptional need or in case of failure or unavailability of a propulsion chain element, while having a limited mass so as not to reduce capacity of transporting passengers or goods.

Incidentally, an aircraft is known, comprising, on the one hand, a mechanically driven propulsion rotor and, on the other hand, an electrically driven propulsion rotor.

Document US 2019/061924 A1 teaches a propulsion chain of several propulsion rotors that are mechanically driven via a gearbox, of the planetary type, driven by a turbomachine. Document US2018/037333A1 teaches a hybrid propulsion chain that comprises an electric generator that powers electric motors.

SUMMARY

The invention relates to a hybrid propulsion chain for an aircraft, the hybrid propulsion chain comprising a plurality of propulsion rotors connected to an electrical distribution module by a plurality of electrical connections, the electrical distribution module being connected, on the one hand, to a non-propulsion turbomachine via an electric generation system and, on the other hand, to an electric battery, each propulsion rotor comprising a stator member and at least one rotor shaft which is configured to be rotatably driven with respect to the stator member when the stator member is powered by at least one electrical connection.

The invention is remarkable in that the hybrid propulsion chain comprises an auxiliary mechanical drive system mechanically connected to the non-propulsion turbomachine, the auxiliary mechanical drive system comprising a plurality of mechanical connections for mechanically rotatably driving at least one rotor shaft of each propulsion rotor.

By non-propulsion turbomachine, it is meant a turbomachine that does not directly provide a propulsion force by means of a propeller in normal operation. This is in contrast to a turbomachine equipped with a fan. By auxiliary system, it is meant a system that is only active when needed. By definition, the term auxiliary means corresponds to something "in addition to something else, momentarily or secondarily".

By virtue of the invention, in the event of a failure of the hybrid propulsion chain without the non-propulsion turbomachine being unavailable, mechanical power can be advantageously drawn from the non-propulsion turbomachine in order to drive one or more propulsion rotors via the mechanical connections. The reliability of the propulsion chain is improved without increasing the mass significantly as would be the case with duplicated or redundant batteries. Advantageously, the mechanical connections and electrical connections can be used concomitantly so as to provide the propulsion rotors with additional propulsive power, for example, during takeoff or landing, to perform an evasive action, etc.

Preferably, the electric generation system comprises a mechanical distribution module mechanically connected as an input to the non-propulsion turbomachine and mechanically connected as an output to at least one current generator. The auxiliary mechanical drive system is connected to the mechanical distribution module. Thus, the auxiliary mechanical drive system is integrated with the electric generation system, thereby limiting overall size and mass.

Further preferably, the mechanical connections of the auxiliary mechanical drive system are connected as an output of the mechanical distribution module. Advantageously, the mechanical distribution module has outputs for current generators and outputs for the mechanical connections, the architecture being compact.

Preferably, the hybrid propulsion chain comprises a mechanical distribution module mechanically connected as an input to the non-propulsion turbomachine and mechanically connected as an output, on the one hand, to the electric generation system and, on the other hand, to the auxiliary mechanical drive system. Thus, the auxiliary mechanical drive system is mechanically connected to the non-propulsion turbomachine indirectly. Advantageously, the use of a mechanical distribution module makes it possible to control use of the mechanical and electric propulsion.

According to one aspect, each mechanical connection is connected to a rotor shaft of a propulsion rotor by a controllable coupling device. This advantageously allows a mechanical drive to be controlled only when needed, preferably, to provide redundancy.

Preferably, the controllable coupling device is configured to be activated automatically in the event of a drop in the speed of a rotor shaft of a propulsion rotor relative to its speed setpoint when the propulsion rotor is powered by an electrical connection. Thus, the coupling device provides safety in the event of a malfunction. By drop in the speed, it is meant a decrease in the order of 5% to 10% in the nominal speed during a period in the order of 1 second.

According to one aspect, the controllable coupling device comprises at least one freewheel. Advantageously, such a freewheel allows an automatic coupling to be performed in the event of a decrease in speed.

According to another aspect, the controllable coupling device comprises at least one first friction member and at least one second friction member.

According to one aspect, each propulsion rotor comprises at least one propulsion fan, preferably two counter-rotating propulsion fans.

The invention also relates to an aircraft comprising a hybrid propulsion chain as set forth above.

The invention further relates to a method for using an aircraft as set forth previously, the method comprising:
- a step of driving a plurality of propulsion rotors via the electrical connections, and
- a step of driving at least one of said propulsion rotors via at least one mechanical connection in case of partial or total unavailability of the electric generation system.

BRIEF DESCRIPTION OF THE DRAWINGS

The invention will be better understood upon reading the following description, given solely by way of example, and referring to the appended drawings given as non-limiting examples, in which identical references are given to similar objects and in which.

It should be noted that the figures set out the invention in detail for implementing the invention, said figures can of course be used to better define the invention if necessary.

DETAILED DESCRIPTION

Figure 1:
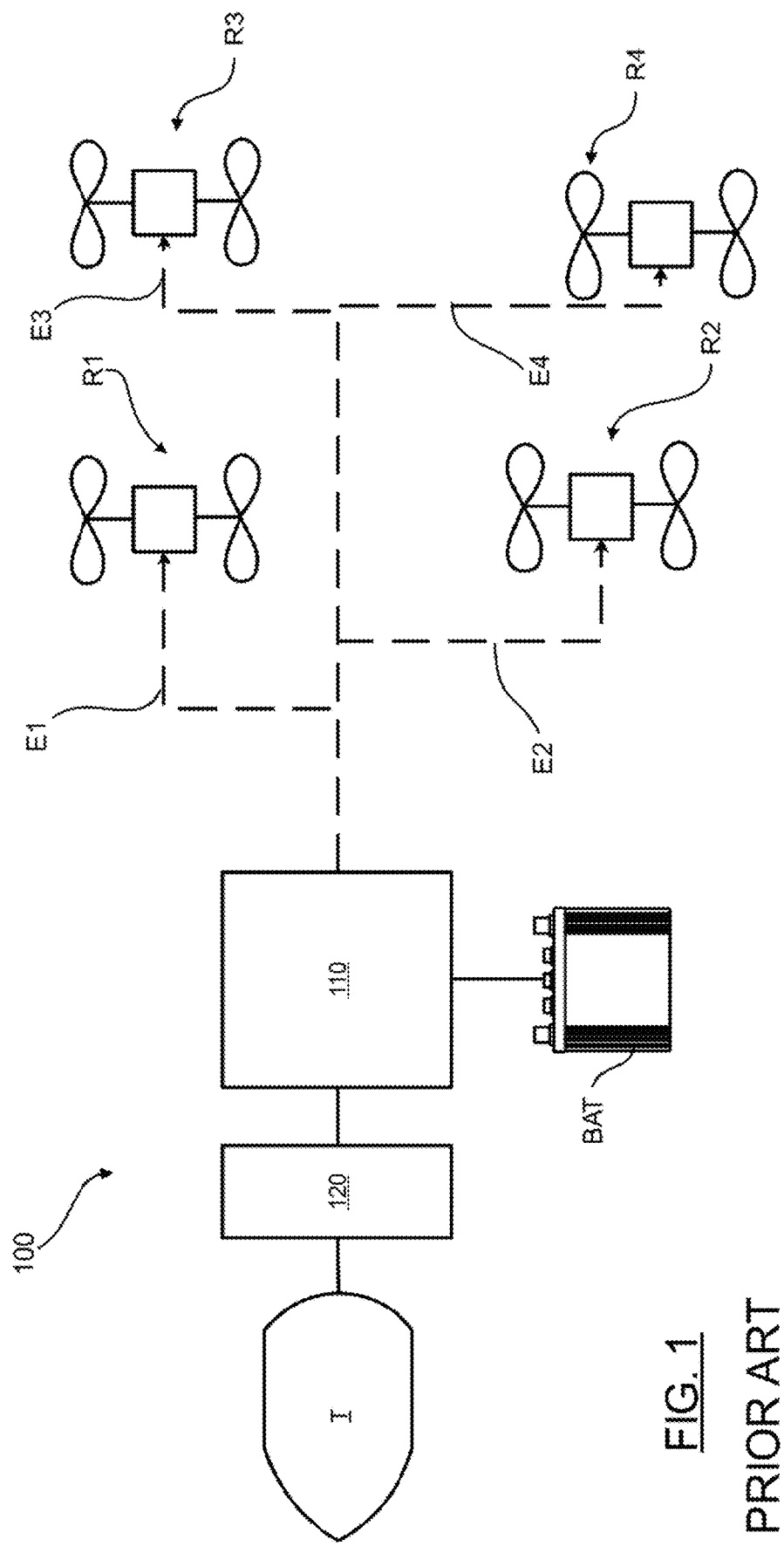
FIG. 1 is a schematic representation of a hybrid propulsion chain of an aircraft according to prior art.
Figure 2:
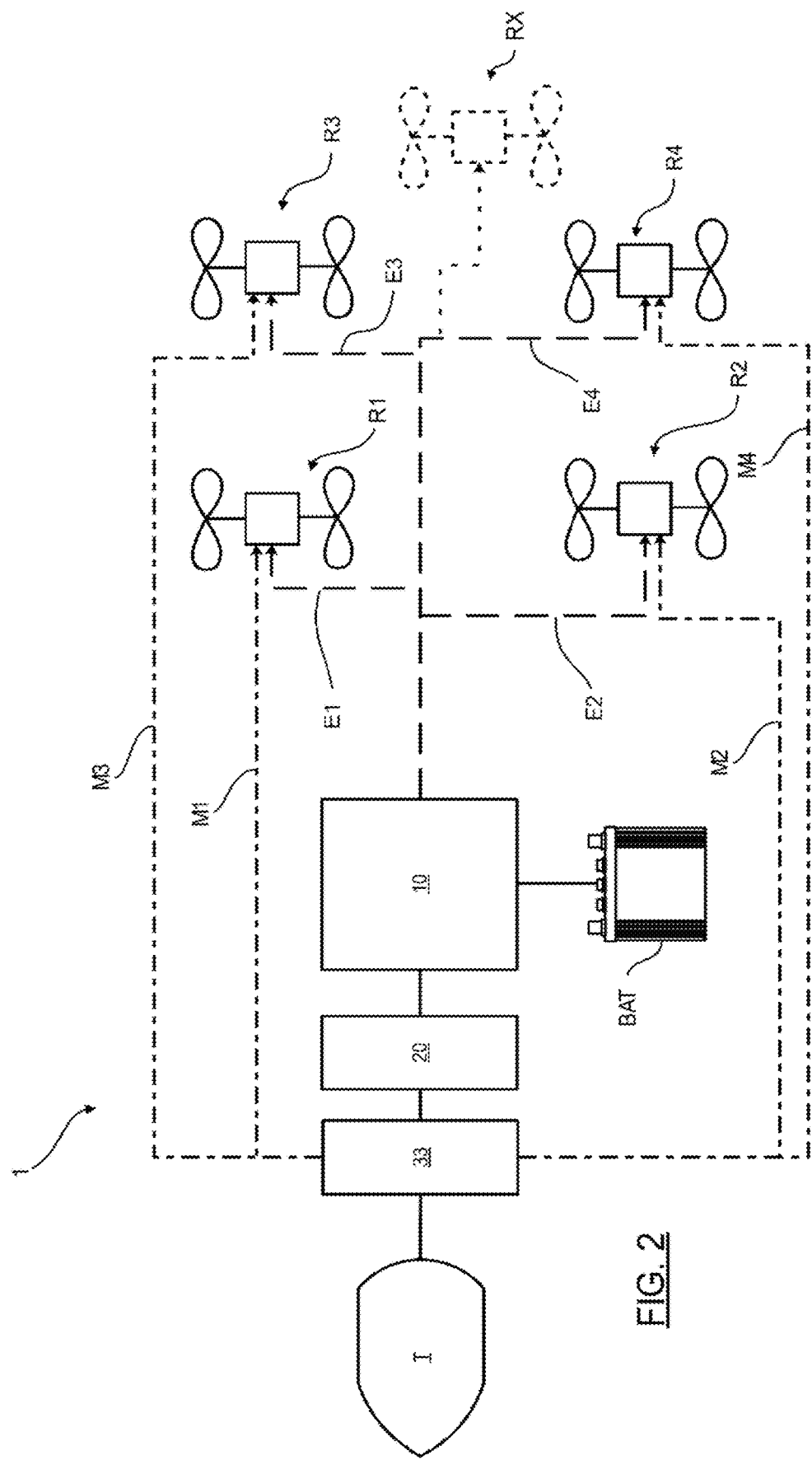
FIG. 2 is a schematic representation of a hybrid propulsion chain of an aircraft of an aircraft according to a first embodiment of the invention.

With reference to FIG. 2, a hybrid propulsion chain 1 for an aircraft according to one embodiment is represented. In this example, the hybrid propulsion chain 1 comprises a plurality of propulsion rotors R1-R4 connected to an electrical distribution module 10 through a plurality of electrical connections E1-E4, the electrical distribution module 10 being connected, on the one hand, to a non-propulsion turbomachine T via an electric generation system 20 and, on the other hand, to an electric battery BAT. By electric battery BAT, it is meant both a single electric battery BAT and a set of several batteries BAT.

The non-propulsion turbomachine T can take various forms, in particular, a fixed turbine gas turbine, a free turbine gas turbine, a piston engine or the like. Advantageously, the non-propulsion turbomachine T is thermal.

Figure 5:
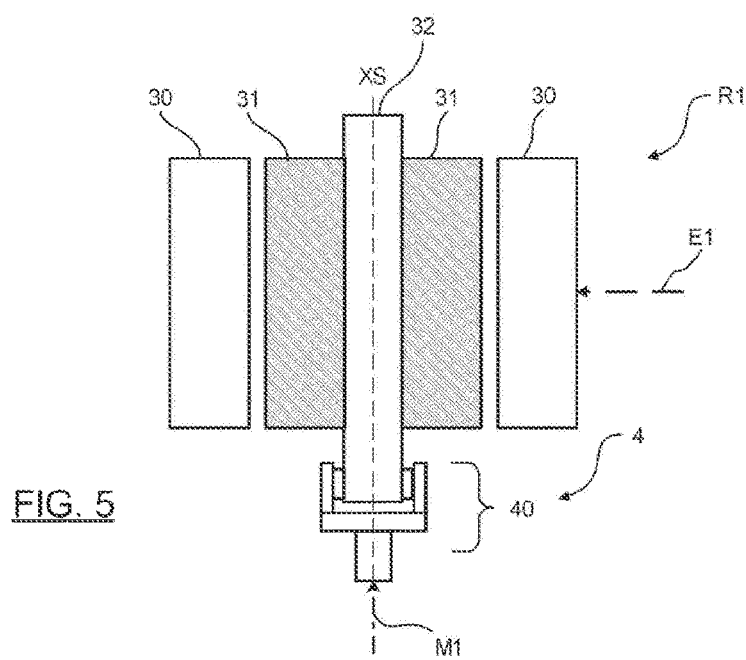
FIG. 5 is a schematic cross-sectional representation of a propulsion rotor equipped with a first example of controllable coupling system.
Figure 6:
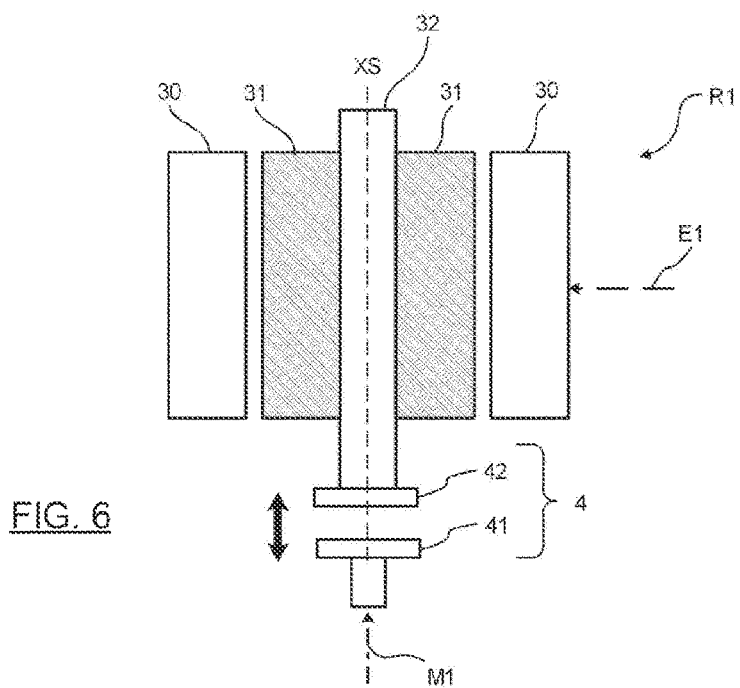
FIG. 6 is a schematic cross-sectional representation of a propulsion rotor equipped with a second example of controllable coupling system.

In this example, 4 propulsion rotors R1-R4 are represented but it goes without saying that their number could be different. Additional propulsion rotors RX could be provided as illustrated in FIG. 2. As illustrated in FIGS. 5 and 6 which will be set forth in detail later, each propulsion rotor R1-R4 will be set forth in detail later, each propulsion rotor R1-R4 has a stator member 30 and a rotor shaft 32 which is configured to be rotatably driven about an axis XS relative to the stator member 30 when the stator member 30 is electrically powered. Each propulsion rotor R1-R4 comprises a propulsion fan (not represented) attached to the rotor shaft 32. In this example, each propulsion rotor R1-R4 comprises a rotor member 31 mounted integral with the rotor shaft 32. The rotor member 31 is magnetically coupled to the stator member 30 so as to form an electric motor, for example, of the permanent magnet synchronous, synchronous with wound rotor members, asynchronous, or reluctance type, etc.

Figure 7:
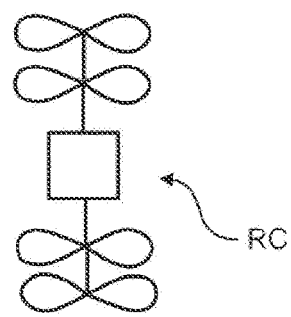
FIG. 7 is a schematic cross-sectional representation of a propulsion rotor comprising two counter-rotating propulsion fans.

With reference to FIG. 7, according to one aspect of the invention, each propulsion rotor RC has two counter-rotating propulsion fans. By way of example, rotor shaft 32 drives a second rotor shaft to which the second fan is mounted. Further, each fan may or may not be shrouded, and may or may not be steerable. Optionally, each propulsion rotor R1-R4 may comprise an electrical converter, for example, an inverter.

An electrical distribution module 10 is known per se to those skilled in the art and makes it possible to manage electrical resources of the battery BAT and of the electric generation system 20 according to the needs of the propulsion rotors R1-R4, charge level of the battery BAT, operating conditions of the aircraft, etc. The electrical distribution module 10 is connected to each propulsion rotor R1-R4 through one or more electrical connections E1-E4. Preferably, the electrical distribution module 10 comprises power electronic converters in order to adapt, if necessary, the level and form (AC/DC) of the electric voltage as an output of the electric generation systems 20, driven or non-driven components ensuring transport and delivery of the electric current (terminal block, relays . . . ) and driven or non-driven components ensuring safety of goods and persons (circuit breaker, fuses . . . ).

In this example, each electrical connection E1-E4 is in the form of a power supply bus, but it goes without saying that it could be in a different form. Preferably, each electrical connection E1-E4 comprises electrical protection means, in particular, a fuse, a circuit breaker, a contactor or the like.

With reference to FIGS. 5 and 6, each electrical connection E1-E4 electrically powers the stator member 30 of a propulsion rotor R1-R4 so as to magnetically rotatably drive the rotor member 31. Since the rotor member 31 is integral with the rotor shaft 32 and the fan, the fan is also rotatably driven, thereby providing thrust to the propulsion rotor R1-R4.

In a known manner the electric generation system 20 comprises one or more current generators as well as one or more converters, in particular of the type AC-DC type. By way of example, a current generator may be in the form of a permanent magnet synchronous electric machine, a synchronous electric machine with wound rotors, or an asynchronous machine. Similarly, by way of example, the converter may be in the form of a passive diode rectifier, a driven active rectifier or the like, or a reversible inverter.

According to the invention, with reference to FIG. 2, the hybrid propulsion chain 1 comprises an auxiliary mechanical drive system 33 mechanically connected to the non-propulsion turbomachine T. The auxiliary mechanical drive system 33 comprises a plurality of mechanical connections M1-M4 for mechanically rotatably driving the rotor shaft 32 of each propulsion rotor R1-R4. Preferably, each mechanical connection M1-M4 is in the form of a drive shaft that is adapted to be rotatably driven by the non-propulsion turbomachine T.

In other words, in this example, each propulsion rotor R1-R4 is connected, on the one hand, to an electrical connection E1-E4 so as to allow electrical thrust of the propulsion rotor R1-R4 and, on the other hand, to a mechanical connection M1-M4 so as to allow mechanical thrust of the propulsion rotor R1-R4. Thus, each propulsion rotor R1-R4 is redundant so as to improve reliability of the hybrid propulsion chain 1.

According to a first embodiment of the invention, with reference to FIG. 2, the auxiliary mechanical drive system 33 is distinct from the electric generation system 20.

Preferably, as illustrated in FIG. 2, the electric generation system 20 is connected to the auxiliary mechanical drive system 33 which is configured to draw a first mechanical torque for the electric generation system 20 and a second mechanical torque mechanical torque to drive the mechanical connections M1-M4. Such an auxiliary mechanical drive system 33 is also referred to as an "auxiliary transmission device".

Figure 3:
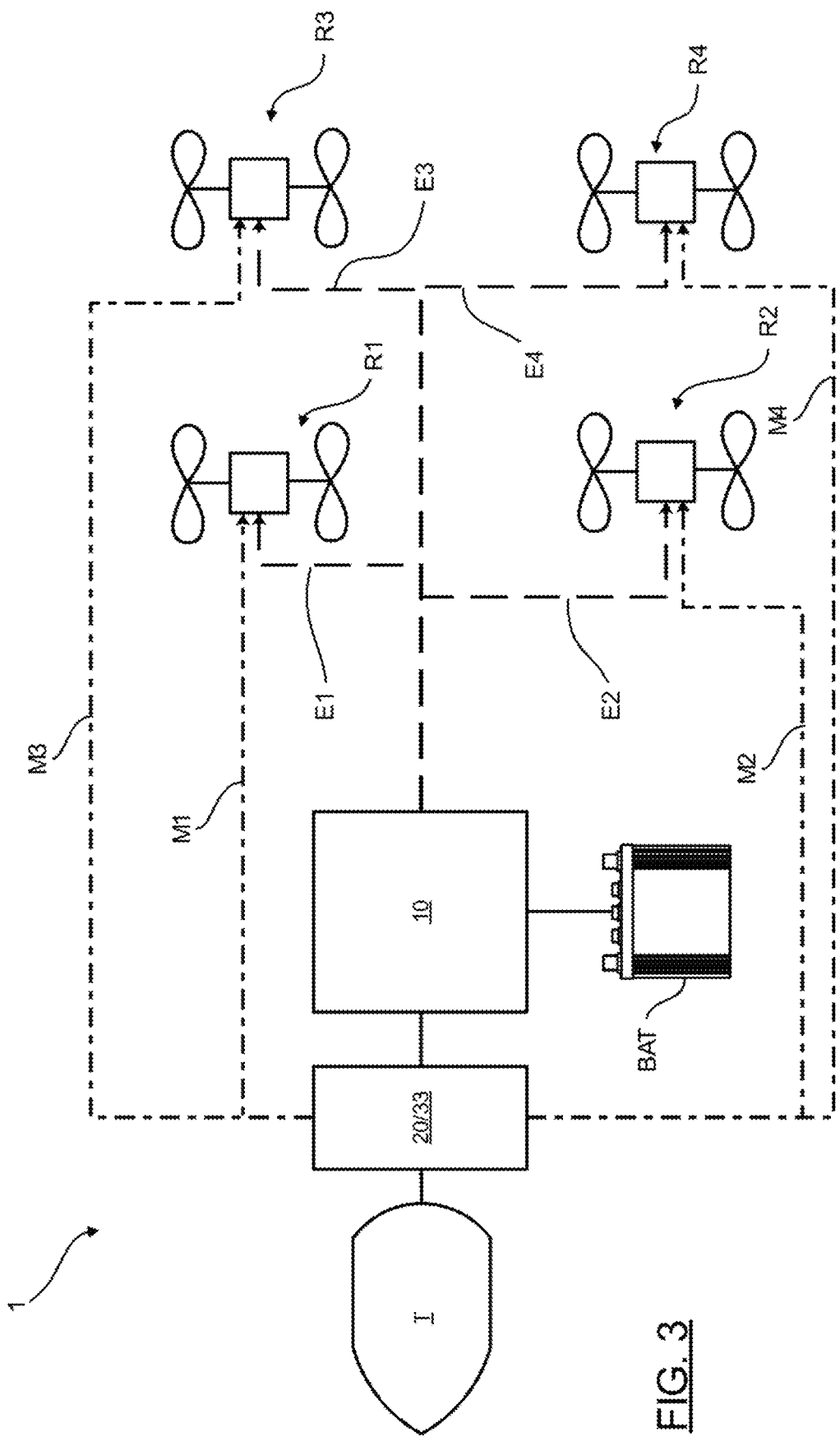
FIG. 3 is a schematic representation of a hybrid propulsion chain of an aircraft according to a second embodiment of the invention.

According to a second embodiment of the invention, with reference to FIG. 3, the auxiliary mechanical drive system 33 is integrated with the electric generation system 20. Such integration allows the overall size as well as the mass to be limited. In other words, the power draw-off device is integrated with the electric generation system 20.

Figure 4:
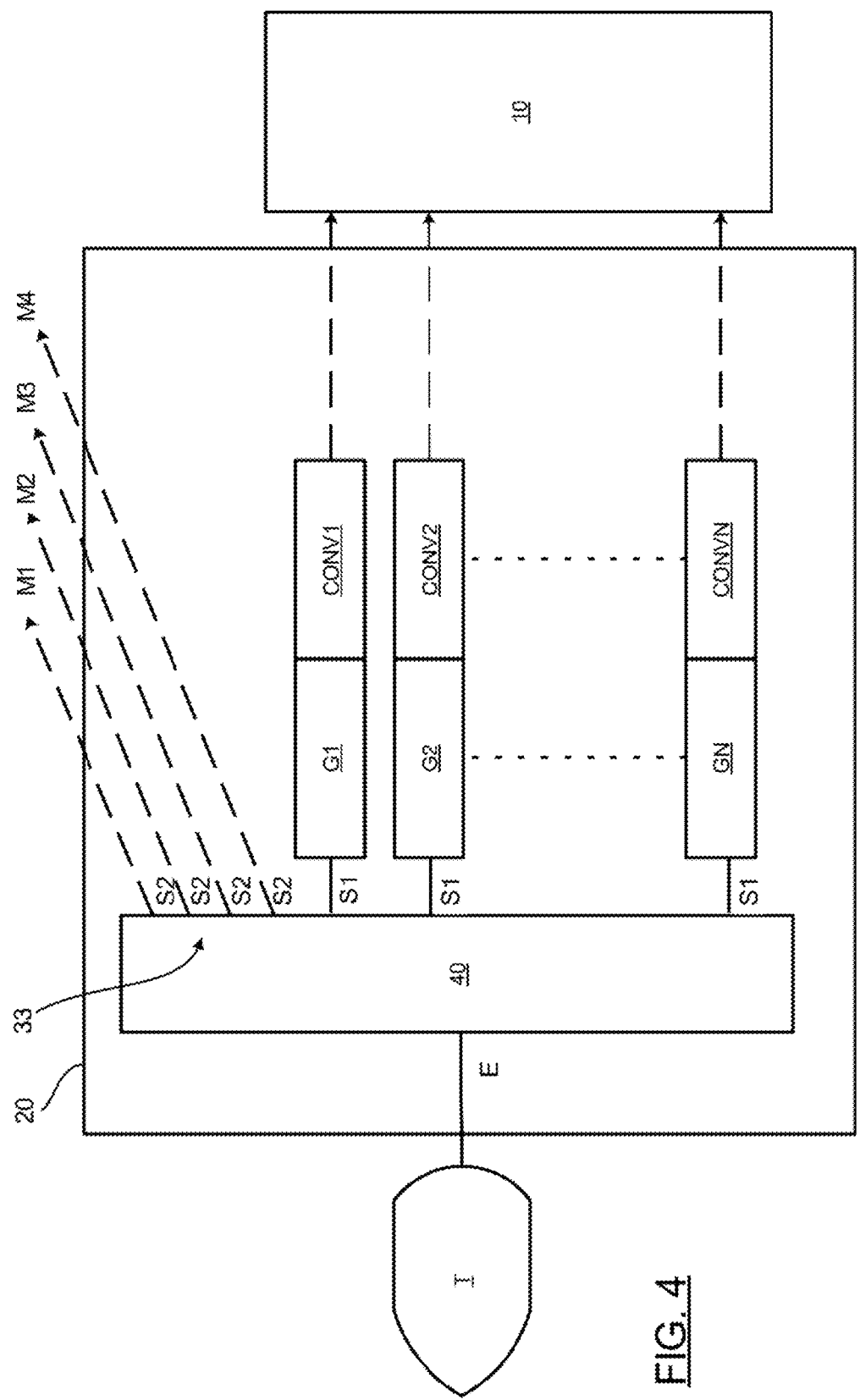
FIG. 4 is a schematic representation of the electric generation system of the hybrid propulsion chain of FIG. 3.

By way of example, with reference to FIG. 4, the electric generation system 20 comprises a plurality of current generators G1, G2, GN as well as a plurality of converters CONV1, CONV2, CONVN in order to electrically power the electrical distribution module 10. The electric generation system 20 further comprises a mechanical distribution module 40 comprising an input E adapted to receive an input mechanical torque from the non-propulsion turbomachine T and a plurality of first outputs 51 to provide elementary mechanical torques to the current generators G1, G2, GN so that they generate electric energy.

In this example, the mechanical distribution module 40 further comprises a plurality of second outputs S2 to provide elementary mechanical torques to the mechanical connections M1-M4 to rotatably drive them. In other words, the mechanical distribution module 40 makes it possible, on the one hand, to provide mechanical energy to indirectly power the electrical connections E1-E4 and, on the other hand, to provide mechanical energy to directly power the mechanical connections M1-M4. Thus, the auxiliary mechanical drive system 33 is directly connected to the mechanical distribution module 40.

In this example, the mechanical distribution module 40 comprises a plurality of gears and is preferably in the form of a gear train.

According to one aspect, the mechanical distribution module 40 is controllable to activate/inactivate the second outputs S2 depending on the operating conditions. As will be set forth later, the second outputs S2 are preferably activated in the event of a fault in the electric generation or during an additional propulsive power requirement. By additional power requirement, it is meant a power requirement greater than 100% of the nominal electrical power, preferably less than 130% of the nominal electrical power.

To enable control, the mechanical distribution module 40 comprises a controllable decoupling system, for example, of the clutch, hydrokinetic coupler, dog clutch type or the like.

Figure 8:
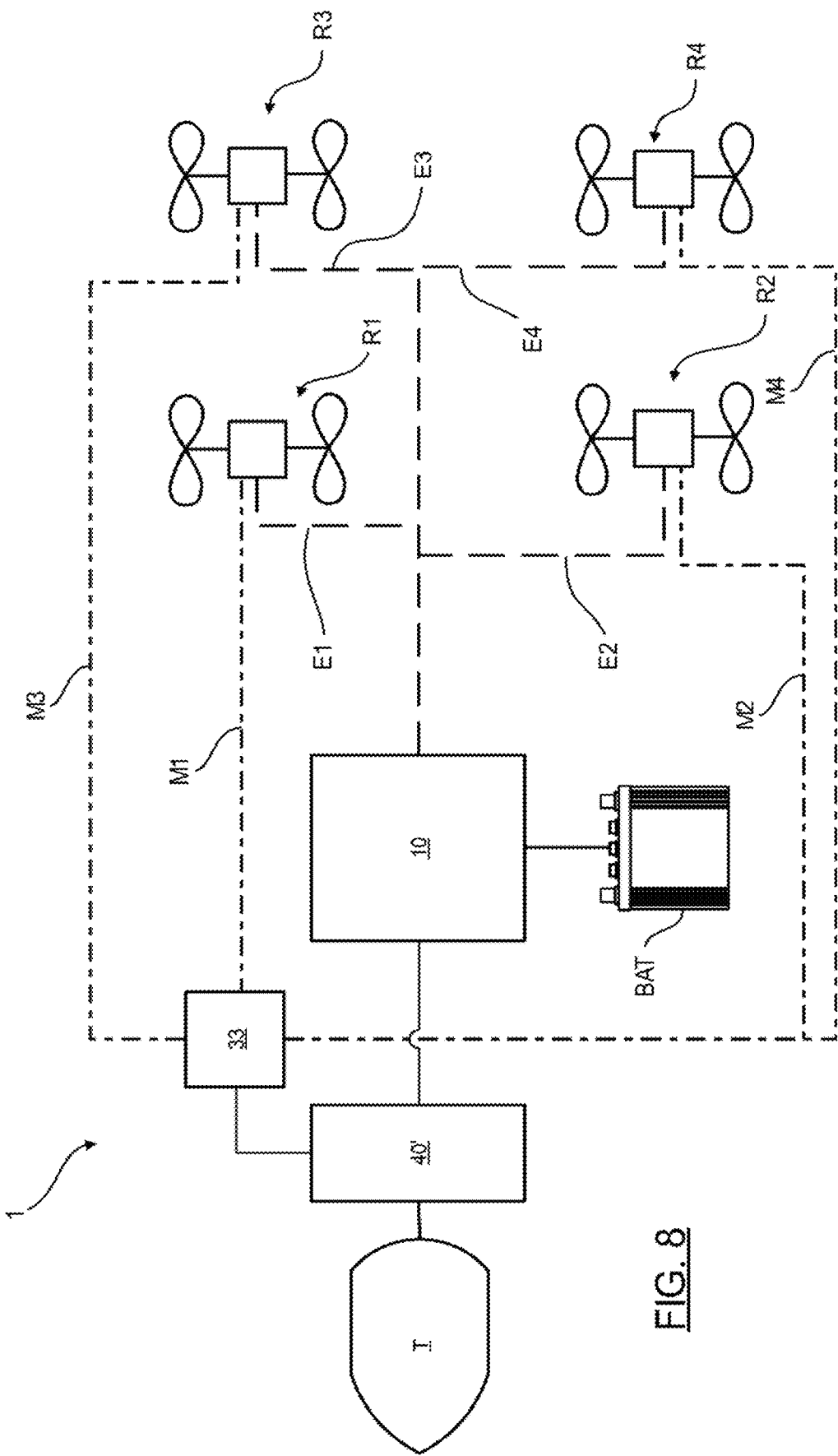
FIG. 8 is a schematic representation of a hybrid propulsion chain of an aircraft according to a third embodiment of the invention.

According to another embodiment, with reference to FIG. 8, the hybrid propulsion chain 1 comprises a mechanical distribution module 40' mechanically connected as an input to the non-propulsion turbomachine T and mechanically connected as an output, on the one hand, to the electric generation system 20 and, on the other hand, to the auxiliary mechanical drive system 33. Thus, the auxiliary mechanical drive system 33 is mechanically connected to the non-propulsion turbomachine T indirectly. Preferably, the electric generation system 20 and the auxiliary mechanical drive system 33 remain independent. The architecture is parallel.

Preferably, each mechanical connection M1-M4 is connected to a rotor shaft 32 of a propulsion rotor R1-R4 by a controllable coupling device so that drive of the rotor shaft 32 of the propulsion rotor R1-R4 can be activated or deactivated by the mechanical connection M1-M4.

By way of example, with reference to FIGS. 5 and 6, a propulsion rotor R1 is represented, comprising a stator member 30 connected to an electrical connection E1 and a rotor shaft 32 which is configured to be rotatably driven with respect to the stator member 30 when the stator member 30 is electrically powered. The rotor shaft 32 is connected to the mechanical connection M1 through a controllable coupling device 4 for mechanically coupling or decoupling the mechanical connection M1 and the rotor shaft 32.

With reference to FIG. 5, according to a first embodiment, the controllable coupling device 4 comprises a freewheel 40. This advantageously allows a coupling depending on the relative speed of the mechanical connection M1 and the rotor shaft 32. By way of example, the electrical connection E1 drives the rotor shaft 32 at a higher speed than that of the mechanical connection M1, the freewheel 40 not performing a coupling. When the electrical connection E1 stops, the speed of rotation of the mechanical connection M1 is greater than that of the rotor shaft 32. The freewheel 40 then performs a mechanical coupling of the mechanical connection M1 and the rotor shaft 32.

Advantageously, the controllable coupling device 4 is activated in the event of a drop in the speed of the rotor shaft 32 relative to its speed setpoint. Preferably, the hybrid propulsion chain 1 is configured to drive each mechanical connection M1-M4 at the speed of rotation setpoint of the propulsion rotors R1-R4. Thus, in case of mechanical drive, it is optimal. Preferably, the hybrid propulsion chain 1 is configured to electrically drive each propulsion rotor R1-R4 at a speed of rotation higher than the speed of rotation of the mechanical connection M1-M4, that is, higher than the speed of rotation setpoint of the propulsion rotors R1-R4. Preferably, the speed of rotation is a few percent higher than the speed of rotation setpoint, for example, in the order of 3%.

Advantageously, due to the small difference in speed, in the event of a power supply failure, the mechanical connection M1-M4 automatically takes over in a smooth, jerk-free manner.

With reference to FIG. 6, according to a second embodiment, the controllable coupling device 4 comprises a first friction member 41, integral with the mechanical connection M1, and a second friction member 42, integral with the rotor shaft 32, configured to cooperate with the first friction member 41 when the mechanical connection M1 and the rotor shaft 32 are mechanically coupled. When the mechanical connection M1 and the rotor shaft 32 are not mechanically coupled, the first friction member 41 remains away from the second friction member 42. Such a clutch system is known in the field of transport vehicles.

It goes without saying that the mechanical connection M1 could also be in direct engagement with rotor shaft 32, for example, by using an angle transmission or a universal block.

An example of implementation of the hybrid drive train 1 will now be set forth.

During normal operation of the hybrid propulsion chain 1, the non-propulsion turbomachine T generates electric energy which powers the propulsion rotors R1-R4 via the electrical connections E1-E4. During this operation, the mechanical connections M1-M4 are not activated.

In the event of a failure of the hybrid propulsion chain 1 without unavailability of the non-propulsion turbomachine T (in particular an electric generation failure), mechanical power can advantageously be drawn from the non-propulsion turbomachine T in order to drive one or more propulsion rotors R1-R4 via the mechanical connections M1-M4 which have been activated.

Advantageously, the mechanical connections M1-M4 and the electrical connections E1-E4 can be used concomitantly so as to provide the propulsion rotors R1-R4 with additional propulsive power, for example, during takeoff or landing, to perform an evasive action, etc.

By virtue of the invention, such a hybrid propulsion chain 1 has a limited mass to improve availability and reliability in comparison with the addition of new electric batteries BAT. Such an auxiliary mechanical drive system 33 has a proven reliability due to the fact that it is essentially based on mechanical components. Advantageously, the mass of the electric batteries BAT can be reduced by taking advantage of the auxiliary mechanical drive system 33, which allows the different propulsion needs to be met.

The invention claimed is:

1. A hybrid propulsion chain for an aircraft, the hybrid propulsion chain comprising a plurality of propulsion rotors connected to an electrical distribution module through a plurality of electrical connections, the electrical distribution module being connected, on the one hand, to a non-propulsion turbomachine via an electric generation system and, on the other hand, to an electric battery, each propulsion rotor comprising a stator member and at least one rotor shaft which is configured to be rotatably driven with respect to the stator member when the stator member is powered by at least one electrical connection, wherein the hybrid propulsion chain comprises an auxiliary mechanical drive system mechanically connected to the non-propulsion turbomachine, the auxiliary mechanical drive system comprising a plurality of mechanical connections for mechanically rotatably driving the at least one rotor shaft of each propulsion rotor, each mechanical connection being connected to a rotor shaft of a respective propulsion rotor by a controllable coupling device.

2. The hybrid propulsion chain according to claim 1, wherein the electric generation system comprises a mechanical distribution module mechanically connected as an input to the non-propulsion turbomachine and mechanically connected as an output to at least one current generator, the auxiliary mechanical drive system is connected to the mechanical distribution module.

3. The hybrid propulsion chain according to claim 2, wherein, the mechanical connections of the auxiliary mechanical drive system are connected as an output to the mechanical distribution module.

4. The hybrid propulsion chain according to claim 1, comprising a mechanical distribution module mechanically connected as an input to the non-propulsion turbomachine and mechanically connected as an output, on the one hand, to the electric generation system and, on the other hand, to the auxiliary mechanical drive system.

5. The hybrid propulsion chain according to claim 1, wherein the controllable coupling device is configured to be activated automatically in the event of a drop in the speed of the rotor shaft of a propulsion rotor relative to its speed setpoint when the propulsion rotor is powered by an electrical connection.

6. The hybrid propulsion chain according to claim 5, wherein the controllable coupling device comprises at least one freewheel.

7. The hybrid propulsion chain according to claim 5, wherein the controllable coupling device comprises at least one first friction member and at least one second friction member.

8. The hybrid propulsion chain according to claim 1, wherein each propulsion rotor comprises at least one propulsion fan, two counter-rotating propulsion fans.

9. An aircraft comprising the hybrid propulsion chain according to claim 1.

10. A method for using the aircraft according to claim 9, the method comprising:
- a step of driving the plurality of propulsion rotors via the electrical connections, and
- a step of driving at least one of said propulsion rotors via at least one mechanical connection in case of partial or total unavailability of the electric generation system.

* * * * *